Figure 1:
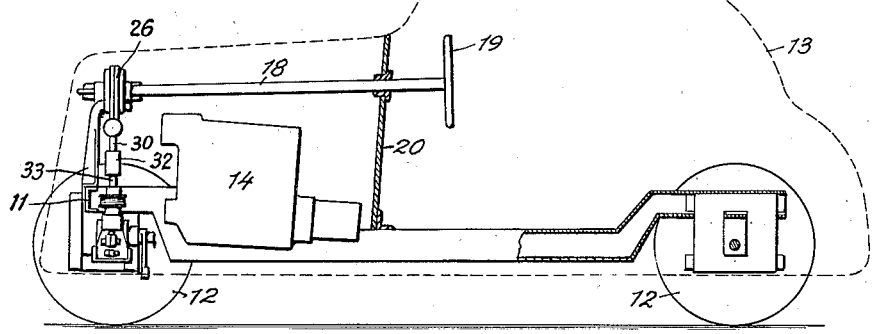

Sept. 28, 1937. J. KOLBE 2,094,541
STEERING ARRANGEMENT FOR MOTOR VEHICLES
Filed Aug. 27, 1935 2 Sheets-Sheet 1

Inventor
Joachim Kolbe
by Bryant & Lowry
Attorneys

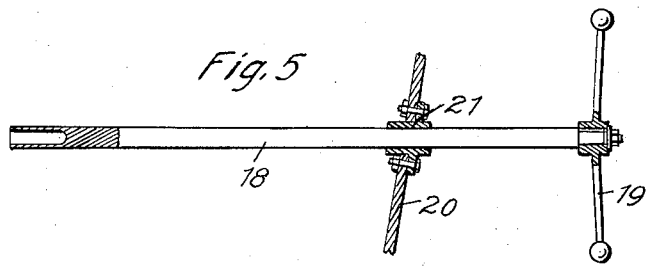
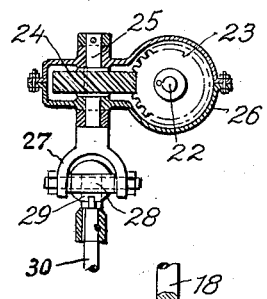
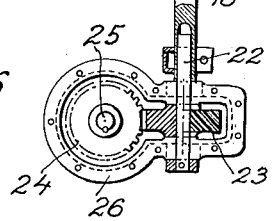
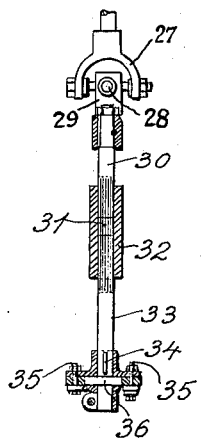
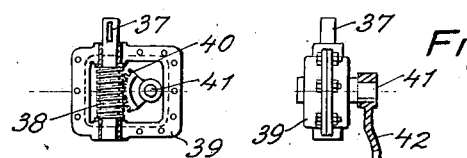
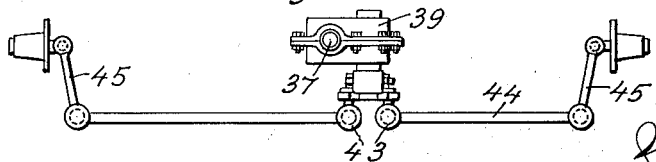

Patented Sept. 28, 1937

2,094,541

UNITED STATES PATENT OFFICE 2,094,541

STEERING ARRANGEMENT FOR MOTOR VEHICLES

Joachim Kolbe, Hanover, Germany

Application August 27, 1935, Serial No. 38,094
In Germany August 28, 1934

2 Claims. (Cl. 280—87)

The invention relates to a motor vehicle with an improved steering gear. Steering gears consist usually of a steering column with a hand wheel and which operate through a worm gear a steering arm which is connected through steering knuckle joints and tie rods to the steering lever of the wheels.

The invention is intended more particularly for the control of so-called curve compensating vehicles, that is, for motor vehicles in which the carriage body is not connected with the axles directly or through springs, as is generally usual, but in which the carriage body is, for example, so connected with the axles through links in the form of obliquely arranged supports, that on the occurrence of lateral forces, for example, of centrifugal force in running on curves, the carriage body is displaced with respect to the axle framework, that is, is obliquely inclined so that the passengers do not notice the centrifugal force.

With such vehicles, therefore, the usual steering arrangement cannot be used, since the body moves with respect to the axle framework and consequently great changes in length and position in the steering connections and objectionably large annular deflections at the joints would tend to occur.

One feature of the invention consists in so constructing the steering gear that the steering column is rigidly connected with the carriage body and can thus accompany the movements thereof, whilst the actual steering arrangements are firmly connected for example with the front axle, self acting means such as a composite shaft being operatively connected between the two to compensate for relative movement between the two parts so that in every case a reliable coupling is obtained.

Substantially the invention is based on the idea that the axis of oscillation of the body is to be used as far as possible as the position of a flexible joint between the steering column and the composite shaft. Since the axis of oscillation of the body is usually situated at a rather high level, this simple solution will not in all cases be sufficient and it may be advisable to connect the shaft flexibly both to the steering column and also to the steering devices which are connected with the lower part thereof and furthermore to give it the possibility of varying in length. A reliable steering of the vehicle will then be possible under all circumstances in spite of the inclined position of the body with respect to the axle framework.

Whereas generally, the usual worm gear is connected at the end of the steering column, it is preferable in the device according to the invention to fix the worm casing to the front axle, thus placing it below the above-mentioned composite shaft.

Figure 2:
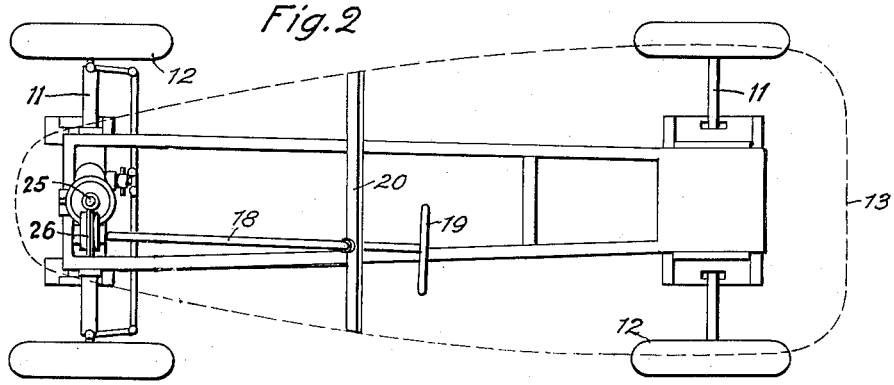
Figure 3:
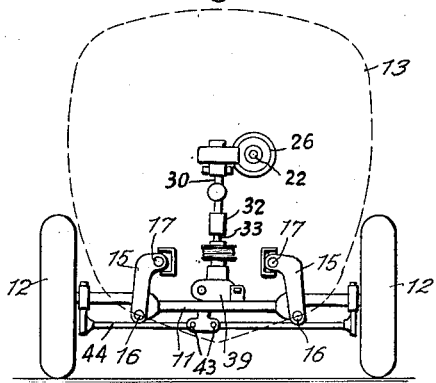
Figure 4:
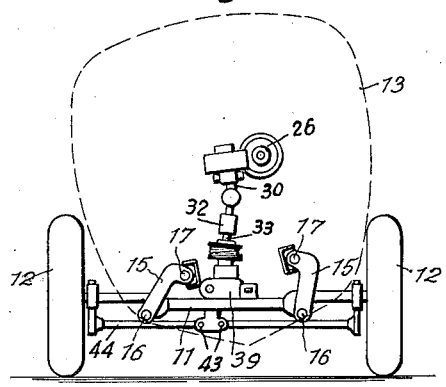

An example of one construction of steering gear according to the invention will be described with reference to the accompanying drawings in which:

Fig. 1 shows a side view partly in section through a motor vehicle having a body which can be inclined with respect to the axle framework, Fig. 2 is a diagrammatic plan of the vehicle, Figs. 3 and 4 are front end elevational views of the vehicle, one in the normal position and the other during the inclined position of the body, Fig. 5 is a side view partly in section of the steering column, Fig. 6 shows a skew gear transmission in plan, partly in section, Fig. 7 is a vertical sectional view of the gear transmission shown in Figure 6, Fig. 8 is a partly sectional representation of the composite shaft with a Hardy disc fitted at the lower end, Figs. 9 and 9a show the worm drive in two different views, Fig. 10 shows the steering mechanism for the wheels which is connected onto the worm drive.

The motor vehicle according to Figures 1, 2, 3, and 4 includes two axles, front and rear, 11, with the wheels 12 and the body 13 which is only indicated by its shape in outline. In the body is fitted as usual the motor, which drives in any desired manner, say, the rear wheels.

The connection between the front axle 11 and the body or upper part 13 is made, as is clearly shown in Figures 3 and 4, through links 15 which are carried at 16 by the axle and, at the other end 17 by the upper part or body, and in such a manner that the upper joint points 17 have a shorter lateral distance apart than the lower joint points 16.

Under the influence of lateral forces, such as are produced by centrifugal forces in running on curves, the body will be displaced to an inclined position, as shown in Fig. 4, so that the passengers will not feel the effect of the centrifugal force.

If now with such a construction the usual steering gear were used, then if the steering wheel, steering shaft and worm gear were fixed on the front axle, these parts would shift in front of the driver when running on curves. If, however, the parts were carried in the upper part or body, variations in length of the steering tie rods would take place and make reliable steering impossible.

In order to avoid this, the steering arrangement is constructed in the following way:

The steering column 18 (Figs. 1 and 2, and 5, 6, and 7) carries at one end the usual steering wheel 19. The steering column is shown approximately horizontal and is carried firmly, but so as to be rotatable about its longitudinal axis, by a guide 21, in the dashboard 20 which is fixed in the upper part or body and thus oscillates with this. The steering column 18 is connected at the forward end, through a groove and feather connection, with a shaft 22, which carries a skew gear 23, which is coaxial with the steering column, as is shown by Figures 6 and 7. This gear 23 engages with a skew gear 24 located with its axis vertical and which is fitted on a shaft 25, which extends approximately vertically. The skew gears are enclosed in a casing 26 which is fixed in any desired manner on the upper part or body.

Underneath there is connected to the shaft 25 a fork 27 which in known manner surrounds the ball ring 28 of a universal joint. On this ball ring 28 is connected the fork 29 which is connected with a shaft 30, the other end 31 of which is grooved. Over this grooved part is fitted a sleeve 32 also grooved internally, in the other end of which is inserted a shaft 33, preferably, however, fast with the sleeve 32.

This connection permits a certain longitudinal displacement in the composite shaft which is formed by the shafts 33 and 30 and the sleeve 32.

At the lower end of the shaft 33 is fitted a disc 36 by means of a wedge 34 and bolts 35, and the disc is connected with the worm shaft 37 of the worm 38, which is located in a casing 39 fixed as shown particularly in Figures 3 and 4, on the under frame. In the casing 39 is also located the worm wheel sector 40, the shaft 41 of which extends outside and supports the steering arm 42 keyed thereon, on the free ends of which engage through ball joints 43, the connecting links 44, which through the steering levers 45, control the wheels in a known manner.

When, therefore, with this arrangement the steering wheel is rotated the running wheels can be directed by means of the various transmission parts. When, during this the body is displaced with respect to the axles, the composite transmission shaft 30, 32, 33 with the universal joint 27, 28, 29 will equalize the relative movements between the steering column and the worm gear without any reactions on the ends of the steering gear taking place.

If, for any reason, it should not be possible to obtain for the universal joint a position which does not shift during the inclined position, or to bring the universal joint 27, 28, 29 so high that it is located exactly or approximately on the axis about which the upper part or body oscillates, a second flexible joint may if necessary be provided on the lower end of the intermediate shaft 30, 32, 33.

The basic idea of the invention therefore consists essentially in not allowing the transverse movements of the upper part or carriage body to affect the steering mechanism whilst nevertheless so arranging the positive coupling of the gear to operate all constructional parts of the steering, that even with a pronounced transverse movement of the upper part or carriage body, a guiding of the steered running wheels, free from shaking is ensured.

Having now described the invention, what I claim is:

1. A motor vehicle comprising a running gear including front and rear wheeled axles, a body, and obliquely arranged links for supporting the body on the running gear with the upper ends of the links closer together than the lower ends thereof whereby the body is adapted to assume an inclined banking position when travelling through curves on roads, a horizontal steering column mounted on the body, steering levers and a worm gear mounted on the running gear, connections between the steering levers and front steering wheels, a universal joint coupled with the free end of the steering column and located in the axis of oscillation of the body, and a composite shaft with a length compensating device extending perpendicularly between the universal joint of the steering column at its upper end and the worm gear at its lower end and compensating for transverse movements of the body without affecting the steering mechanism.

2. A motor vehicle comprising front and rear wheeled axles, a body and obliquely arranged single links connecting the body and axles for supporting the body on the axles with the upper ends of the links closer together than the lower ends thereof whereby the body is adapted to assume an inclined banking position while travelling through curves on roads, a horizontal steering column mounted on the body, steering levers and a worm gear mounted on the front axle, connections between the steering levers and front steering wheels, a universal joint coupled with the free end of the steering column and located in the axis of oscillation of the body, and a composite shaft with a length compensating device extending perpendicularly between the universal joint of the steering column at its upper end and the worm gear at its lower end and compensating for transverse movements of the body without affecting the steering mechanism.

JOACHIM KOLBE.